(12) United States Patent
Megat Abdul Aziz et al.

(10) Patent No.: US 10,058,137 B2
(45) Date of Patent: Aug. 28, 2018

(54) TEXTURED GLOVES

(71) Applicant: Ansell Limited, Richmond, Victoria (AU)

(72) Inventors: Putri Faridatul Akmar Binti Megat Abdul Aziz, Selangor (MY); Mei Yee Chin, Selangor (MY); Mohd Fairuz Bin Mohamad Zawawi, Selangor (MY); Norazilayati Binti Rastam, Selangor (MY)

(73) Assignee: Ansell Limited, Victoria (AU)

( * ) Notice: Subject to any disclaimer, the term of this patent is extended or adjusted under 35 U.S.C. 154(b) by 250 days.

(21) Appl. No.: 14/880,718

(22) Filed: Oct. 12, 2015

(65) Prior Publication Data

US 2016/0100638 A1 Apr. 14, 2016

Related U.S. Application Data

(60) Provisional application No. 62/100,610, filed on Jan. 7, 2015, provisional application No. 62/063,531, filed on Oct. 14, 2014.

(51) Int. Cl.
*B29C 41/14* (2006.01)
*A41D 19/015* (2006.01)
*A41D 19/00* (2006.01)
*A41D 19/04* (2006.01)

(52) U.S. Cl.
CPC ... *A41D 19/01547* (2013.01); *A41D 19/0058* (2013.01); *B29C 41/14* (2013.01); *A41D 19/04* (2013.01); *A41D 2400/80* (2013.01)

(58) Field of Classification Search
CPC ... B29C 43/183; B29C 43/184; B29C 63/025; B29C 66/436; B29C 31/008; B29C 44/14; B29C 44/569; B29C 41/14; B29C 41/08; B29C 41/00; B32D 99/0092; B32B 37/10; B60N 2/5891; A41D 19/0058
See application file for complete search history.

(56) References Cited

U.S. PATENT DOCUMENTS 5,993,923 A 11/1999 Lee
6,081,928 A 7/2000 Bourne
6,143,416 A 11/2000 Brindle et al.
(Continued)

FOREIGN PATENT DOCUMENTS

GB 1310711 A 3/1973

OTHER PUBLICATIONS

International Search Report and Written Opinion dated Dec. 22, 2015 for PCT Application No. PCT/AU2015/000614.
(Continued)

*Primary Examiner* — Stella K Yi
(74) *Attorney, Agent, or Firm* — Moser Taboada

(57) ABSTRACT

Provided among other things is a glove formed by latex dipping having one or more textured finger tips wherein: the texture at the finger tips results from forming the glove on a former having the following properties:

| | | (micrometer) |
|---|---|---|
| Ra | Av. roughness | about 7-14 |
| Rsm | Mean width of roughness | about 500-720 |
| Rpc | Peak count | about 15-20 | the glove being non-chlorinated, wherein the glove is a (i) single dip nitrile glove or (ii) a dipped glove with a textured layer formed of polymer latex, and comprising a multivalent metal ion salt of an organic acid with log P of about 4 to about 15.

13 Claims, 4 Drawing Sheets

(56) References Cited

U.S. PATENT DOCUMENTS

| | | |
|---|---|---|
| 6,732,735 B1 | 5/2004 | Snell |
| 7,771,644 B2 | 8/2010 | Flather et al. |
| 2007/0126149 A1 | 6/2007 | Brown, III et al. |
| 2011/0191936 A1 | 8/2011 | Lipinski et al. |
| 2012/0137404 A1 | 6/2012 | Lipinski |
| 2013/0291203 A1 | 11/2013 | Hassan et al. |

OTHER PUBLICATIONS

Extended European Search Report dated May 3, 2018 for Application No. 15849952.5.

TEXTURED GLOVES

CROSS-REFERENCE TO RELATED APPLICATIONS

This application claims benefit of U.S. provisional patent application Ser. No. 62/063,531, filed Oct. 14, 2014 and provisional patent application Ser. No. 62/100,610, filed Jan. 7, 2015. Each of the aforementioned patent applications is herein incorporated in its entirety by reference.

The present application relates generally to nitrile gloves with molded texture at the finger tips, polymeric gloves with molded texture at the fingertips and containing a multivalent metal ion salt of an organic acid with log P of about 4 to about 15, and a method of making.

In seeking to produce texture on the surface of a single dip polymeric glove by a texture structure found at the surface of the dipping former, it is extremely difficult to produce a glove that has good grip while being reliably formed without holes. It has now been unexpectedly found that good grip can be obtained by carefully selecting certain roughness parameters for the former.

SUMMARY

Provided is a glove formed by latex dipping having one or more textured finger tips wherein: the texture at one or more finger tips results from forming the glove on a former having the following properties at the corresponding finger tip regions:

|     |                        | (micrometer)   |
| --- | ---------------------- | -------------- |
| Ra  | Av. roughness          | about 7-14     |
| Rsm | Mean width of roughness| about 500-720  |
| Rpc | Peak count             | about 15-20    | the glove being non-chlorinated, wherein the glove is a (i) single dip nitrile glove or (ii) a dipped glove with a textured layer formed of polymer latex (e.g., natural rubber latex or another rubber latex, or mixtures), and comprising a multivalent metal ion salt of an organic acid with log P of about 4 to about 15.

Provided is a method of making such a glove comprising: coating a glove former with coagulant; applying a coagulable elastomer formulation to the coagulant coated former so that the former is coated with coagulated elastomer; and curing the elastomer coating, wherein former has the following properties at the corresponding finger tip regions:

|     |                        | (micrometer)   |
| --- | ---------------------- | -------------- |
| Ra  | Av. roughness          | about 7-14     |
| Rsm | Mean width of roughness| about 500-720  |
| Rpc | Peak count             | about 15-20    |

Also provided is a former for making a glove (such as a single dip nitrile glove) having one or more textured finger tips wherein the former has the following properties at the corresponding finger tip regions:

|     |                        | (micrometer)   |
| --- | ---------------------- | -------------- |
| Ra  | Av. roughness          | about 7-14     |
| Rsm | Mean width of roughness| about 500-720  |
| Rpc | Peak count             | about 15-20    |

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
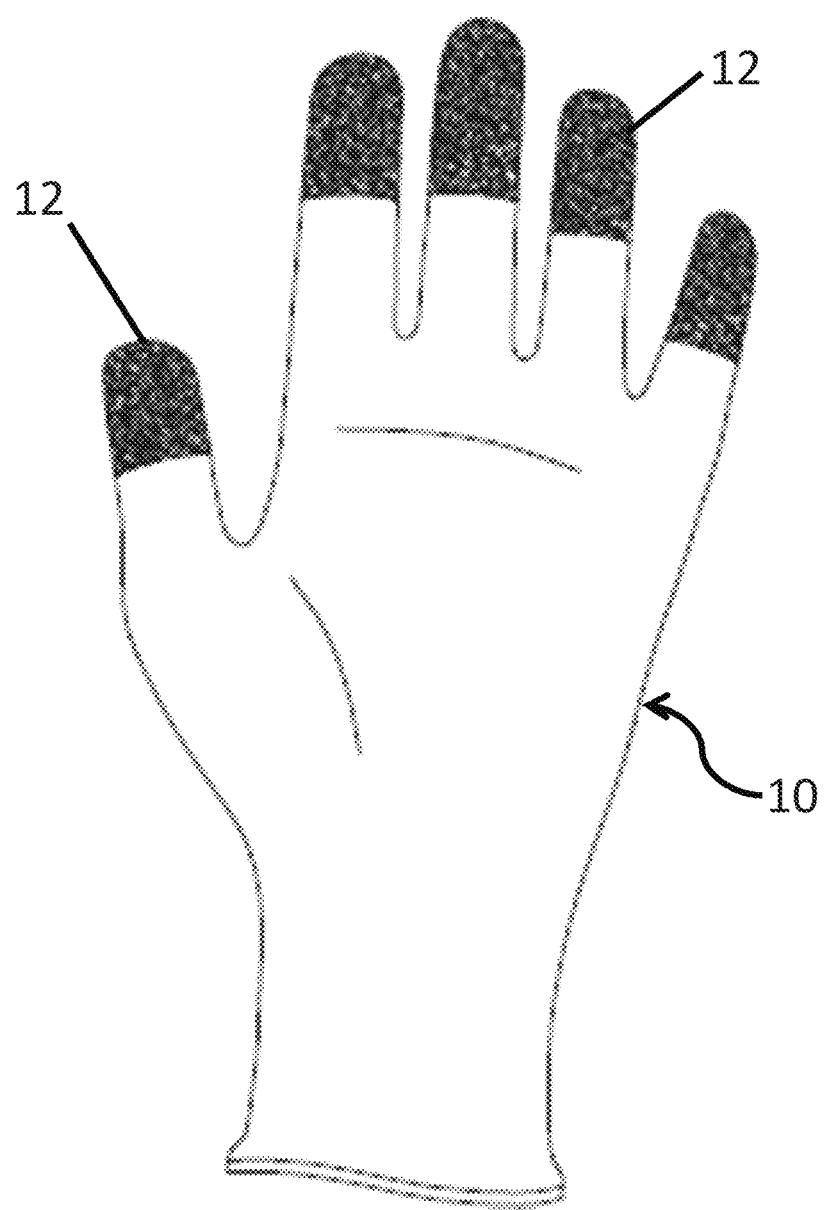
FIG. 1 depicts a glove with texture.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

The glove has one or more textured finger tips. texturing can be on one side, since the gripping side of a finger is on one side. However, it will often be convenient to form the grip on both sides. Grip texture can be at a finger tip, such as about 50% of the way down to the first knuckle crease. Or, texture can be found further down the finger. In embodiments, 2, 3, 4 or 5 fingers have texture. Texture can be formed more generally, but is particularly useful at the finger tips.

FIG. 1 depicts the palm side of a glove 10 with texture at 12 at the finger tips.

Figure 2:
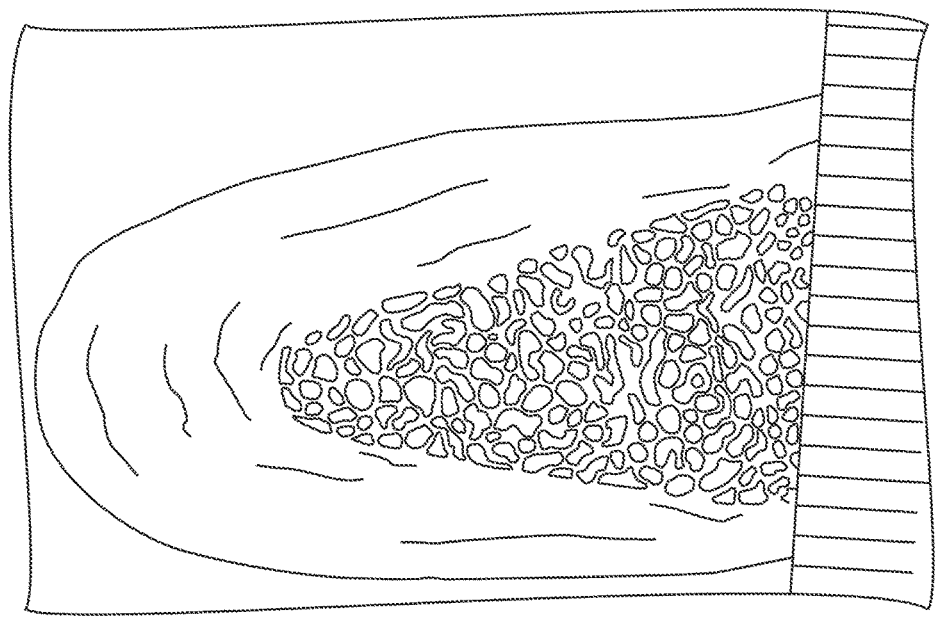
FIG. 2 shows the texture in expanded view.

FIG. 2 shows the texture in expanded view. Each line on the superimposed scale is 1 mm. While the vertical scale is not apparent, the surface was created with, and the thus a reverse image of, a former with the Ra, Rsm, Rpc, Rz, Rmax, Rp and Rv parameters of the narrower ranges recited below.

In embodiments elastomeric layer is primarily acrylonitrile butadiene copolymer (NBR or "nitrile") by polymer content weight (e.g. 80% or more), thus forming for the purposes of this application a "nitrile glove.' Other polymers may be natural rubber latex (including Guayule latex), other synthetic rubber latex, or the like, and combinations thereof. The synthetic rubber latex may be selected, for example, from the group comprised of polychloroprene, polyisoprene, polyurethane, styrene-butadiene, butyl, and combinations thereof. The nitrile can include carboxylated acrylonitrile butadiene copolymer. In embodiments, it is highly carboxylated.

The texture at the finger tips results from forming the glove on a former having one or more of the following values (from about value A to about value B):

|     |                        | (micrometer) | or (micrometer) |
| --- | ---------------------- | ------------ | --------------- |
| Ra  | Av. roughness          | 7-14         | 8-12            |
| Rsm | Mean width of roughness| 500-720      | 610-700         |
| Rpc | Peak count             | 15-20        | 16-19           |

In embodiments, Ra is about 9, 10, 11 or 12. In embodiments, Rsm is about 500, 630, 650 or 670. In embodiments, Rpc is about 17, 18 or 19.

In embodiments, the former of the invention and used in the invention has one or more of the following roughness properties (from about value A to about value B):

|  |  | (micrometer) | or (micrometer) |
|---|---|---|---|
| Rz | Mean roughness depth | 30-50 | 30-45 |
| Rmax | Largest roughness depth | 40-70 | 40-65 |
| Rp | Height of the highest peak | 8-22 | 10-20 |
| Rv | Depth of deepest valley | 16-35 | 18-30 |

In embodiments, Rz is 34, 38, 40 or 42. In embodiments, Rmax is about 47, 53 or 60. In embodiments, Rp is about 13, 15, 17 or 20. In embodiments, Rv is 20, 21, 24 or 27.

The above parameters are as measured by a Perthometer (Mahr GmbH, Göttingen, Germany), with the stylus running at constant speed across 0.22 in (5.6 mm) length of surface. The Roughness profile R describes the departure from the mean line. The average roughness is calculated as described is the arithmetic average of the absolute values of the roughness profile ordinates.

In embodiments, the former is ceramic.

Gloves formed on the above formers can be tested for falling within the claims by reverse molding. For example, the glove can be treated with a release agent if needed, inverted, and used as a mold for a self-curing polymer mixture that solidifies to sufficient hardness to allow for measurement with the Perthometer device. Perthometer values within the above ranges indicate that the former used falls within the above values.

It is believed that better results are obtained in the manufacturing process if the temperature of the leaching process is about 50° C., such as about 45 to about 55° C. The temperature of the gelling (vulcanization) oven can about 120 to about 160° C., such as 125°, 135°, 145° or 155°.

It is believed that better results are obtained in the manufacturing process if the coagulant used in the dipping step includes a fatty acid salt. For example, the following can be used:

| Material | % W/W |
|---|---|
| Water | 70 |
| Calcium nitrate | 24.5 |
| calcium stearate | 5.5 |

In methods of the invention, the coagulant composition can for example comprise multivalent metal ion salt of an organic acid with log P of about 4 to about 15. In all embodiments with an organic acid salt, the organic acid can a for example C14 to C30 fatty acid (whether or not within the log P parameters). In all embodiments with an organic acid salt, the organic acid can be a for example C16 to C20 fatty acid. In all embodiments with an organic acid salt, the multivalent metal ion can be for example Ca, Mg, Zn or Al. In all embodiments with an organic acid salt, the multivalent metal ion can be Ca. In all embodiments with an organic acid salt, such a salt can for example comprises about 5 to about 50% by wt (e.g., 18%) of coagulant compounds in the coagulant composition.

In embodiments, the gloves of the invention comprise a multivalent metal ion salt of an organic acid consistent with any of the above (e.g., C14-C30, even if not with above log P range). The amount present can be the residue remaining after a post-dipping leaching or washing.

In embodiments of the gloves that contain the fatty acid salt (by any definition herein), the polymer of the outer layer can be natural rubber latex (including Guayule latex), other synthetic rubber latex, or the like, and combinations thereof. In embodiments, such a glove is a single dip glove.

Figure 3:
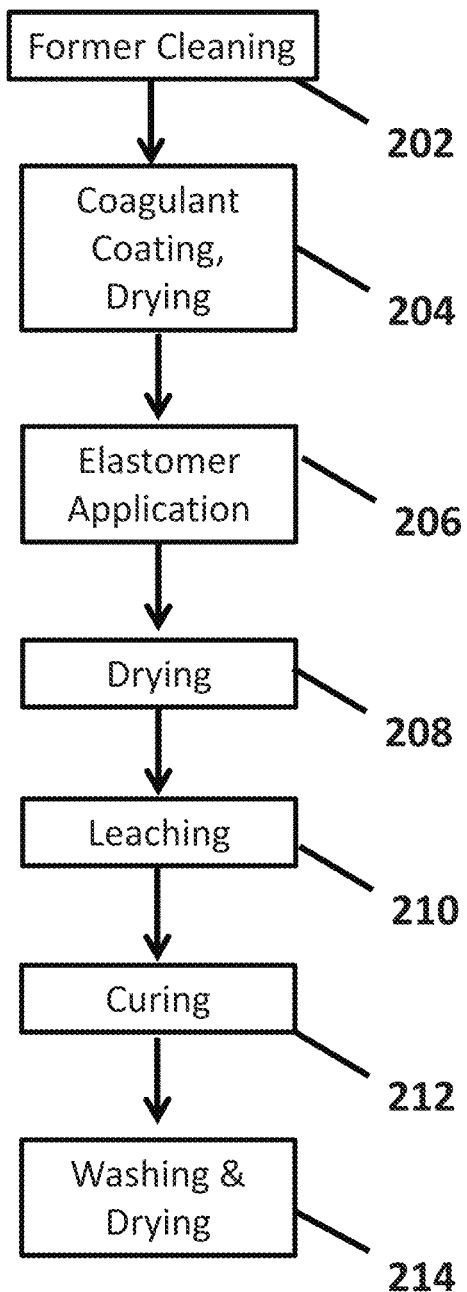
FIG. 3 shows an exemplary method of making.

FIG. 3 shows an exemplary process for forming the article of the invention. Step 202 (optional) is cleaning the textured former. Step 204 is applying coagulant to the former. In the illustrative embodiment, the coagulant is composition is dried at 60-80° C. In step 206, the former is dipped in elastomer composition (compound). In step 208 (optional), the dipped former is dried, for example if a glove with the fingers pointing down.

In step 210 (optional), the article on the dipped former is leached. For example, leaching can be conducted at a moderately elevated temperature that effects some cross-linking. In step 212, the article on the former is cured. In step 214 (optional), the article (typically after stripping from the former) is washed and dried.

Principle of the Test Method

The method uses a 1.0 kg or 1.5 kg weight (e.g., metallic), and measures "Pull Force" needed to grip test bar for lifting the weight, and a "Catch Force" needed to re-grip the test bar after letting it slip.

The test is used to measure the pinch grip performance of glove in grip force (kgf) in a systematic pattern of a pinch grip task. The subject uses only the tips of the first finger and thumb to grip the grip bar. Sufficient grip force between the finger and thumb is required to enable the grip bar to be held in control so that it can then be pulled down in a fixed distance without slipping ("Pull Force"). The pulling down action effectively lifts a specific mass (1.0 kg or/and 1.5 kg) on the other side of a pulley. The grip bar is then released, allowed to slip and then re-gripped ("Catch Force"). Finally the grip bar is returned to the stationary initial position in a controlled manner. The grip bar is wetted with water or covered with oil when performing wet or oil pinch grip test respectively.

TABLE

Test Procedure

General

| | |
|---|---|
| a) | Apply minimum grip force around a grip bar which is sufficient to lift up a certain load. |
| b) | The tester shall use only the tips of the first finger and thumb to grip the grip |
| c) | Preferably use the same size and same side of gloves when conducting the test. |
| d) | The tester shall perform the test by using the dominant hand. |
| e) | The wrist shall be rested on a support (e.g., the lower height indicator block) when re-gripping the slipping grip bar. |

Test Procedure - Dry

| | |
|---|---|
| a) | 2 × 500 g standard weights are slotted onto the mass-holder to provide a 1.0 kg load. |
| b) | The grip bar is cleaned with ethanol and dried to remove any contamination. |
| c) | The tester shall follow the procedure in Table D (below). |
| d) | Repeat Table D steps until three repetitions have been performed for the same glove specimen. |
| e) | 3 × 500 g standard weights are slotted onto the mass-holder to provide a 1.5 kg load. |
| f) | Repeat Table D steps for lifting up the load of 1.5 kg and until three repetitions have been performed for the same glove specimen. |

TABLE-continued

Test Procedure g) Unless otherwise specified, two tests on each sample should be carried out.

Test Procedure - Wet

The same procedure is repeated, but adding the following after step b):
- b-1) Approximately 1.0 ml of water is dripped onto a gauze using a pipettor.
- b-2) Both sides of the grip bar are then wiped with the wetted gauze.

Test Procedure - Oil

The same procedure is repeated, but adding the following after step b):
- b-1*) Approximately 1.0 ml of oil (Shell Rimula x 15 W-40) is dripped onto a gauze using a pipettor.
- b-2*) Both sides of the grip bar are then wiped with the wetted gauze.

Test Procedure - IPA

The same procedure is repeated, but adding the following after step b):
- b-1°) Approximately 1.0 ml of isopropyl alcohol is dripped onto a gauze using a pipettor.
- b-2°) Both sides of the grip bar are then wiped with the wetted gauze.

TABLE D

| Task | Action |
|---|---|
| 1 | Tester uses only the tips of the first finger and thumb to grip the grip bar at the pre-marked position<br>The gloved hand applies just sufficient grip force to pull the grip bar down vertically |
| 2 | The gloved hand's wrist reaches the lower height indicator and stops<br>Tester releases grip allowing the grip bar to slip through the fingers whilst keeping the wrist at the lower height indicator |
| 3 | Tester re-grips grip bar and stops its movement whilst keeping the wrist at the lower height indicator<br>Tester moves grip bar up vertically |
| 4 | Tester releases grip when the grip bar reaches its initial stationary position |

With gloves of the invention, the following oil grip values were obtained:

| 1.0 kg Load | |
|---|---|
| Catch Force (Kgf) | Max Pull Down Force (Kgf) |
| 4.25 | 1.85 |

With gloves of the invention, the following dry grip values were obtained:

| 1.0 kg Load | | 1.5 kg Load | |
|---|---|---|---|
| Catch Force (Kgf) | Max Pull Down Force (Kgf) | Catch Force (Kgf) | Max Pull Down Force (Kgf) |
| 0.12 | 0.15 | 0.35 | 0.22 |

With gloves of the invention, the following wet grip values were obtained:

| 1.0 kg Load | | 1.5 kg Load | |
|---|---|---|---|
| Catch Force (Kgf) | Max Pull Down Force (Kgf) | Catch Force (Kgf) | Max Pull Down Force (Kgf) |
| 0.16 | 0.17 | 0.5 | 0.28 |

With gloves of the invention, the following IPA grip values were obtained:

| 1.0 kg Load | | 1.5 kg Load | |
|---|---|---|---|
| Catch Force (Kgf) | Max Pull Down Force (Kgf) | Catch Force (Kgf) | Max Pull Down Force (Kgf) |
| 1.12 | 0.31 | 4.55 | 1.42 |

In embodiments, gloves of the invention achieve grip values of about 1.5× the values listed above (rounded to the nearest 0.01 value) or less, or about 1.4× or less, or about 1.3× or less, or about 1.2× or less, or about 1.1× or less. In embodiments, gloves of the invention achieve grip values of about 0.5× the values listed above (rounded to the nearest 0.01 value) or more, or about 0.7× or more, or about 0.85× or more. These values apply to gloves of any of the embodiments described above.

Figure 4:
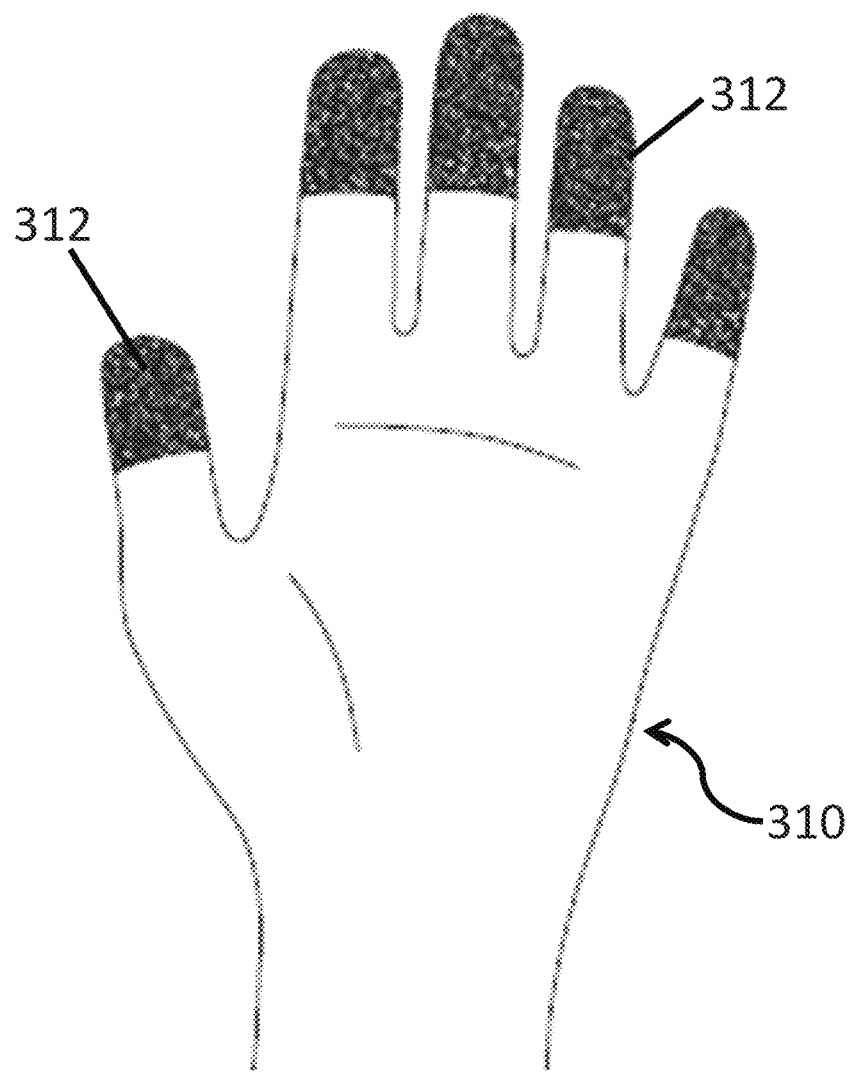
FIG. 4 shows a former for imparting texture.

Formers for use in the invention can be manufactured by casting, selectively sandblasted to form texture, or the like. FIG. 4 depicts a former of the invention in the form of a glove former 310, with the palm side having texture at 312 at the finger tips.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

This invention described herein is of textured gloves, methods of forming the same, and formers for making the gloves. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A method of forming a glove comprising:
coating a glove former with coagulant;
applying a coagulable elastomer formulation to the coagulant coated former so that the former is coated with coagulated elastomer; and
curing the elastomer coating, wherein a grip-defining portion of the former has the following properties:

|  |  | (micrometer) |
| --- | --- | --- |
| Ra | Av. roughness | about 7-14 |
| Rsm | Mean width of roughness | about 500-720 |
| Rpc | Peak count | about 15-20; | and
forming a the glove with a grip portion corresponding to the grip-defining portion of the former, with the glove thereby having texture molded by the grip-defining portion of the former,
wherein the glove formed is a (i) single dip nitrile glove or (ii) a dipped glove with a so textured layer formed of natural rubber latex or synthetic rubber latex, and comprising a multivalent metal ion salt of an organic acid, the organic acid with log P of about 4 to about 15.

2. The method of claim 1, wherein the former has one or more of the following properties:

|  |  | (micrometer) |
| --- | --- | --- |
| Rz | Mean roughness depth | about 30-50 |
| Rmax | Largest roughness depth | about 40-70 |
| Rp | Height of the highest peak | about 8-22 |
| Rv | Depth of deepest valley | about 16-35. |

3. The method of claim 2, wherein the former has one or more of the following properties:

|  |  | (micrometer) |
| --- | --- | --- |
| Ra | Av. roughness | about 8-12 |
| Rsm | Mean width of roughness | about 610-700 |
| Rpc | Peak count | about 16-19. |

4. The method of claim 3, wherein the former has one or more of the following properties:

|  |  | (micrometer) |
| --- | --- | --- |
| Rz | Mean roughness depth | about 30-45 |
| Rmax | Largest roughness depth | about 40-65 |
| Rp | Height of the highest peak | about 10-20 |
| Rv | Depth of deepest valley | about 18-30. |

5. The method of claim 2, wherein the coagulant coating is conducted with a composition comprising a multivalent metal ion salt of an organic acid, the organic acid with log P of about 4 to about 15.

6. The method of claim 1, wherein the coagulant coating is conducted with a composition comprising a multivalent metal ion salt of an organic acid, the organic acid with log P of about 4 to about 15.

7. The method of claim 1, wherein the organic acid is a C14 to C30 fatty acid.

8. The method of claim 1, wherein the organic acid is a C16 to C20 fatty acid.

9. The method of claim 6, wherein the multivalent metal ion salt comprises about 5 to about 50% by wt of coagulant compounds in the coagulant composition.

10. The method of claim 1, wherein the glove formed is a single dip nitrile glove.

11. The method of claim 1, wherein the glove formed is a dipped glove with a so textured layer formed of natural rubber latex or synthetic rubber latex, and comprising a multivalent metal ion salt of an organic acid, the organic acid with log P of about 4 to about 15.

12. The method of claim 4, wherein the glove formed is a single dip nitrile glove.

13. The method of claim 4, wherein the glove formed is a dipped glove with a so textured layer formed of natural rubber latex or synthetic rubber latex, and comprising a multivalent metal ion salt of an organic acid, the organic acid with log P of about 4 to about 15.

* * * * *